United States Patent [19]
Yamabe

[11] Patent Number: 5,832,759
[45] Date of Patent: *Nov. 10, 1998

[54] VEHICLE DETENTION DEVICE

[75] Inventor: Hideyasu Yamabe, Osaka, Japan

[73] Assignee: Atras Auto Co, Osaka, Japan

[*] Notice: The term of this patent shall not extend beyond the expiration date of Pat. No. 5,613,385.

[21] Appl. No.: 797,193

[22] Filed: Feb. 11, 1997

Related U.S. Application Data

[62] Division of Ser. No. 201,855, Feb. 25, 1994, Pat. No. 5,613,385.

[51] Int. Cl.$^6$ ................................................. B60R 25/00
[52] U.S. Cl. ................................. 70/226; 70/14; 70/18; 188/32
[58] Field of Search ................................. 70/14, 18, 19, 70/225, 226, 233–235, 237, 238, 259; 188/32

[56] References Cited

U.S. PATENT DOCUMENTS

| | | | |
|---|---|---|---|
| 3,537,548 | 11/1970 | Jeppesen | 70/18 X |
| 3,687,238 | 8/1972 | Carpenter | 70/18 X |
| 3,695,071 | 10/1972 | West | 70/18 X |
| 3,845,643 | 11/1974 | Barrett | 70/18 |
| 4,723,426 | 2/1988 | Beavdoin | 70/14 |
| 4,804,070 | 2/1989 | Bohler | 70/14 X |
| 5,134,868 | 8/1992 | Bethards | 70/18 |
| 5,176,013 | 1/1993 | Kutauskas | 70/18 |
| 5,271,636 | 12/1993 | Mohrman et al. | 70/226 X |
| 5,333,477 | 8/1994 | Davis | 70/14 X |
| 5,437,171 | 8/1995 | Owen | 70/18 X |
| 5,613,385 | 3/1997 | Yamabe | 70/14 X |

FOREIGN PATENT DOCUMENTS

| | | | |
|---|---|---|---|
| 1072720 | 8/1991 | Australia | 70/226 |
| 379273 | 8/1923 | Germany | 292/339 |
| 4118340 | 4/1992 | Japan | 70/18 |
| 2152890 | 8/1985 | United Kingdom . | |

*Primary Examiner*—Suzanne Dino
*Attorney, Agent, or Firm*—Lalos & Keegan

[57] ABSTRACT

The vehicle detention device disclosed includes a pair of stopper blocks, a locking means, a pair of chains and a cover unit. One stopper block is fixed to a guide shaft and the other stopper block can be movably displaced to accommodate the size of the object tire. Locking means prevents movable stopper block from being displaced away from contact with object tire maintaining stopper block contact with object tire on either side of tire at ground contact point thus preventing rotation. A pair of chains is used to fasten object wheel to detention device when stopper blocks are placed in the engaged position. Key operated cover unit conceals access to mechanical components needed to release the detention device from the fastened condition thus preventing unauthorized removal of the device from the restrained vehicle.

9 Claims, 20 Drawing Sheets

VEHICLE DETENTION DEVICE

This is a divisional of copending application Ser. No. 08/201,855, filed on Feb. 25, 1994, and now U.S. Pat. No. 5,613,385.

FIELD OF THE INVENTION

The present invention relates to a vehicle detention device capable of securely effectuating detention of an objective wheel of a vehicle parking illegally and preventing such vehicle from moving back and forth by securely restraining an objective wheel so that the vehicle can be prevented from being moved.

BACKGROUND OF THE INVENTION

For example, the Japanese Laid-Open Unexamined Utility Model Application No. 62-114856 (1987) discloses art related to a vehicle detention device. The vehicle detention device disclosed in this Utility Model Publication comprises a pair of wheel stopper blocks respectively coming into contact with an external circumferential surface of a tire of a wheel, a connecting member connecting the wheel stopper blocks by extending itself along the external circumferential surface of the wheel in order to shield an air-injecting hole of the tire and the juncture of the tire and the wheel, and a clamping member secured to a shielding member to permit the wheel stopper blocks to clamp the wheel by sandwiching it therebetween.

Nevertheless, the vehicle detention device disclosed in the above-cited reference executes detention of the upper part of the wheel merely by means of the connecting member extending itself along the external circumferential surface of the tire. This in turn causes the upper part of the connecting member to easily be removed towards the surface side of the wheel, and yet, permits the vehicle detention device to easily be disengaged from the wheel merely by lifting the wheel with a jack, thus failing to exert function proper to the vehicle detention device.

SUMMARY OF THE INVENTION

Therefore, the object of the invention is to fully solve the above problem by providing a low cost novel vehicle detention device, which features simple structure, which is difficult to remove from an objective wheel without unlocking a key, and yet, may easily be secured to the objective wheel.

To achieve the above object, the novel vehicle detention device according to the invention comprises the following:

(1) a stopper block secured to a guide shaft; another stopper block movable itself by long and short distances along the guide shaft toward the former stopper block; a locking means preventing the former stopper block from being shifted from an initial position in the direction away from an objective tire in which both the former and latter stopper blocks are in contact with the objective tire at both sides of a point where the tire makes contact with a road surface and against the rotating direction of the objective wheel; a pair of lengthy chains secured to the former and latter stopper blocks, which are respectively extended from the inside to the outside of the objective wheel by way of forming an X-shape while both the former and latter stopper blocks remain in contact with the objective tire, such chains provided in order to fasten and restrain the objective wheel; and a cover unit provided with a locking key, which fully conceals the mechanical components for releasing the state of detention effected by the fastened chains.

(2) A stopper block may be secured to one end of a horizontally extended cylindrical body; another stopper block may be secured to an end of a slidable shaft having the other end being extensible and retractable from and into the other end of the cylindrical body; a locking means which prevents the latter stopper block from being shifted in the direction apart from the objective tire while both the former and latter stopper blocks remain in contact with the objective tire at both sides of a point where the tire makes contact with a road surface and against the rotating direction of the wheel; a pair of chains secured to the former and latter stopper blocks, which are respectively extended from the inside to the outside of the objective wheel by way of forming an X-shape while both the former and latter stopper blocks remain in contact with the objective tire, such chains provided in order to fasten and restrain the objective wheel; and a cover unit provided with a locking key, which fully conceals the mechanical components for releasing the state of detention effected by the fastened chains.

According to the structure set forth in the above description (1), a wheel subject to detention is fastened and restrained by a pair of chains while a pair of stopper blocks are brought into contact with an objective tire at both sides of a point where the tire contacts a road surface and against the rotating direction of the wheel. Mechanical components for releasing the state of detention are fully concealed by a key-provided cover unit. Therefore, no one can easily remove the inventive vehicle detention device from the restrained wheel without unlocking the key, thus securely maintaining the objective wheel under the state of detention. Furthermore, the vehicle detention device according to the invention is simply structured to enable an operator to easily secure the whole device to an objective wheel to effectuate detention. Therefore, the invention can provide an improved vehicle detention device at an inexpensive cost.

According to the structure set forth in the above description (2), one of the pair of stopper blocks is secured to an end of a cylindrical body, while the other stopper block is secured to an end of a slidable shaft having the other end being extensible and retractable from and into the other end of the cylindrical body. Owing to this structural arrangement, insofar as an objective wheel is held under the state of detention, neither the cylindrical body nor the slidable shaft externally protrude itself from a pair of stopper blocks. For example, even when an objective wheel of a parked vehicle having front tires turned from the straight ahead direction is restrained, pedestrians can be prevented from stumbling over the cylinder body or slidable shaft externally extended.

DESCRIPTION OF THE PREFERRED EMBODIMENTS

Figure 1:
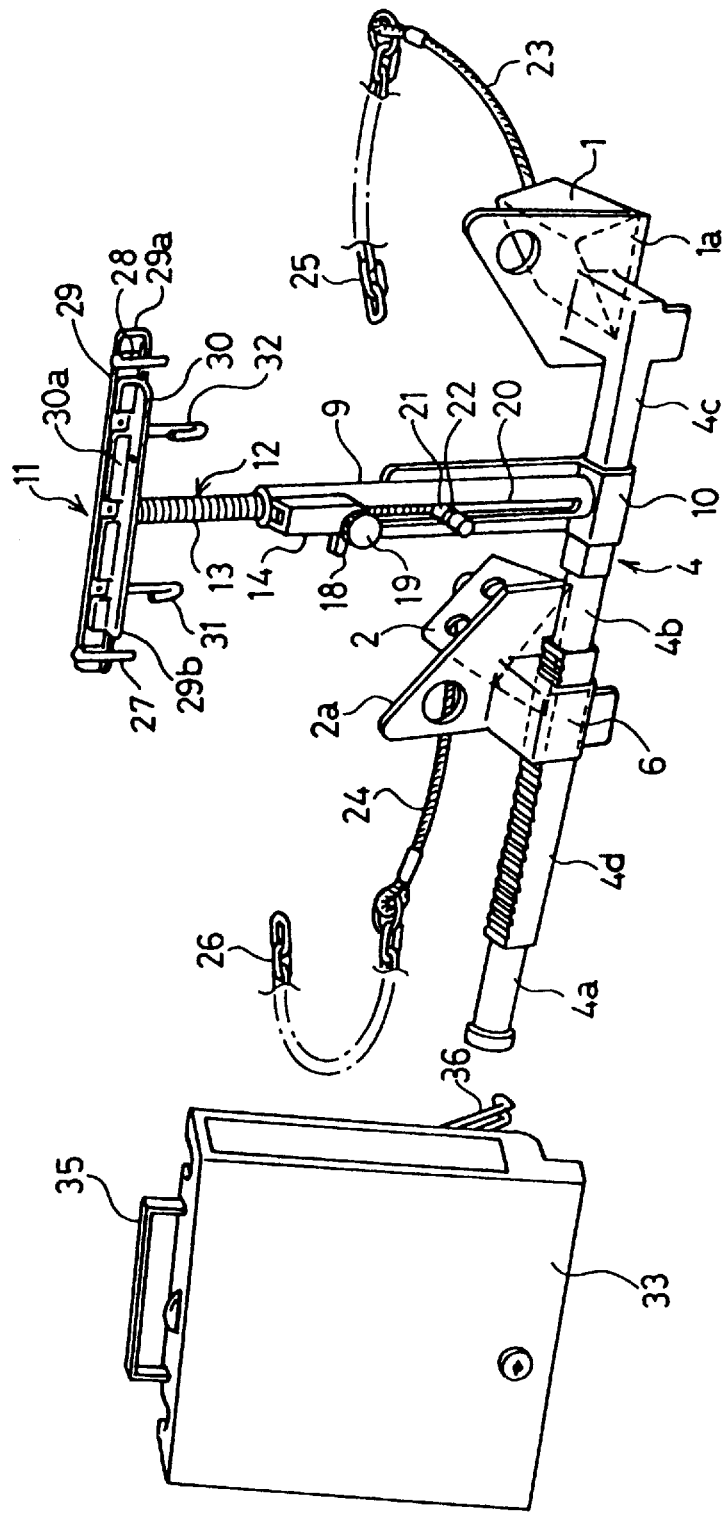
FIG. 1 is an overall perspective view of the vehicle detention device according to the first embodiment of the invention.
Figure 2:
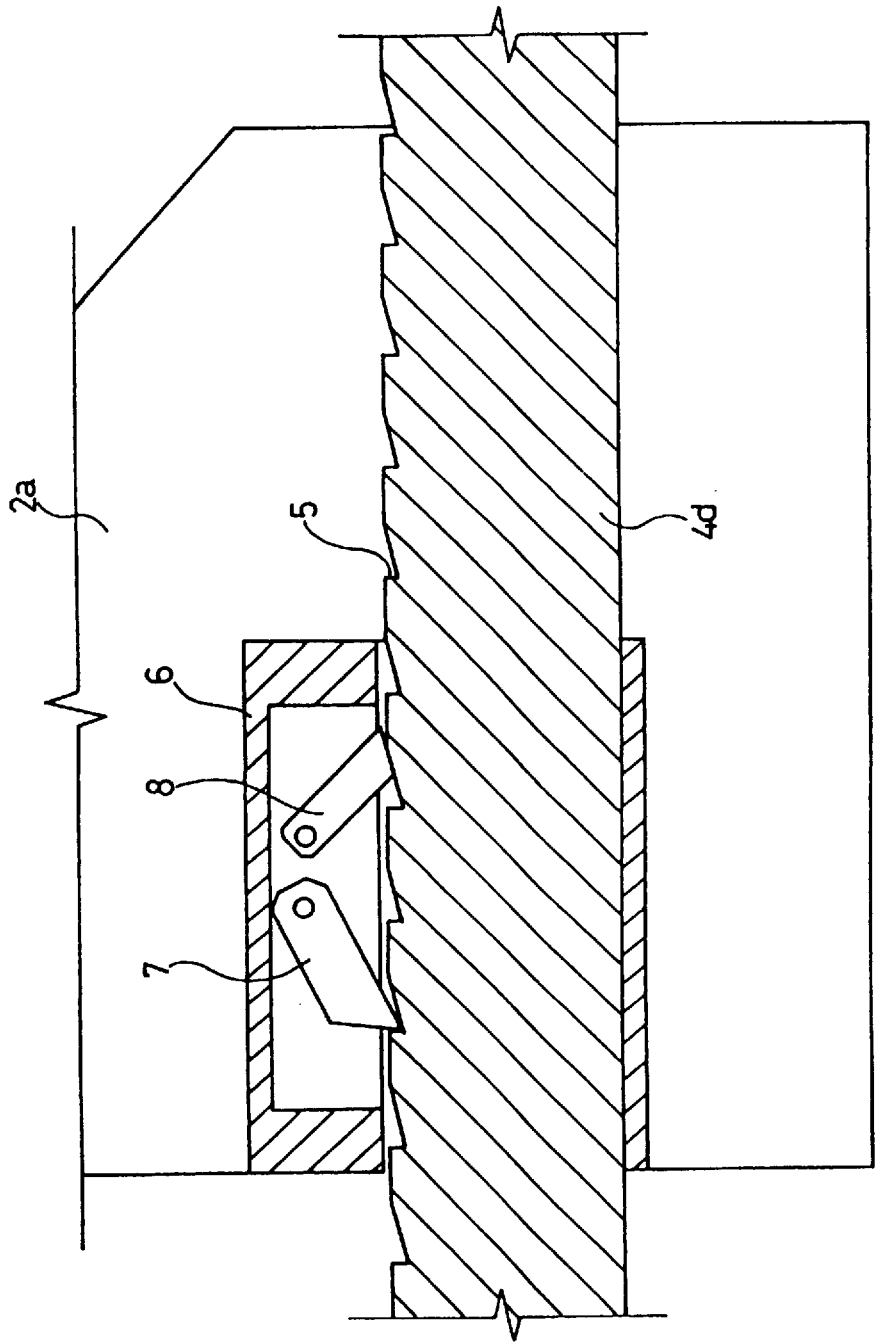
FIG. 2 is a cross-sectional view representing the relationship between a guide cylinder and a locking claw provided inside of a casing.
Figure 3:
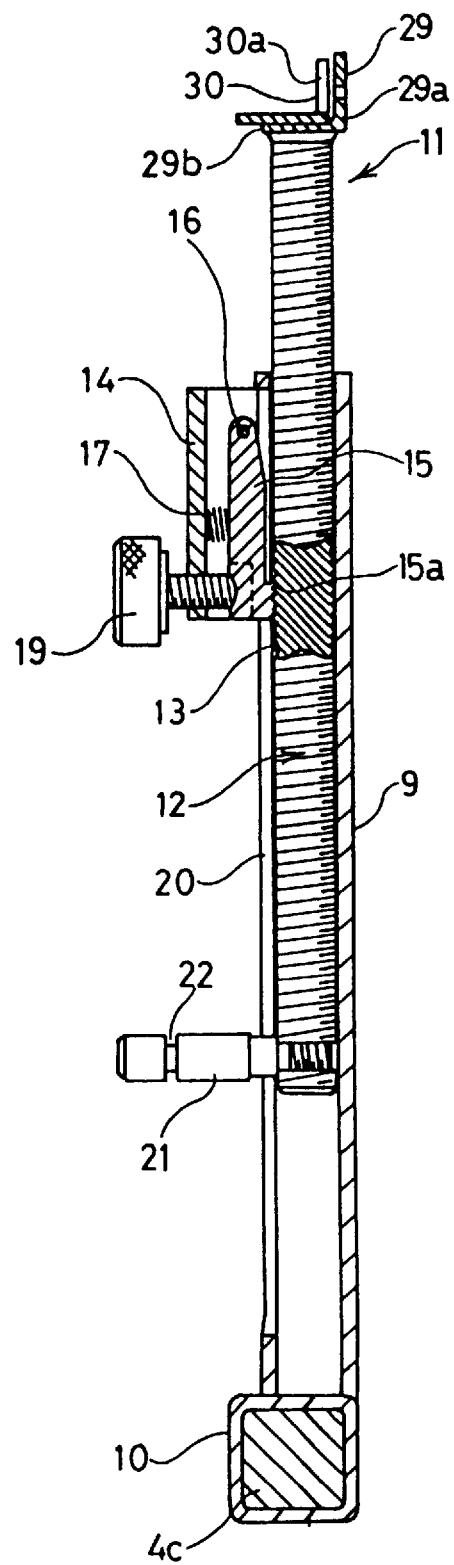
FIG. 3 is a detailed cross-sectional view of a shaft and a strut of an elevating body.
Figure 4:
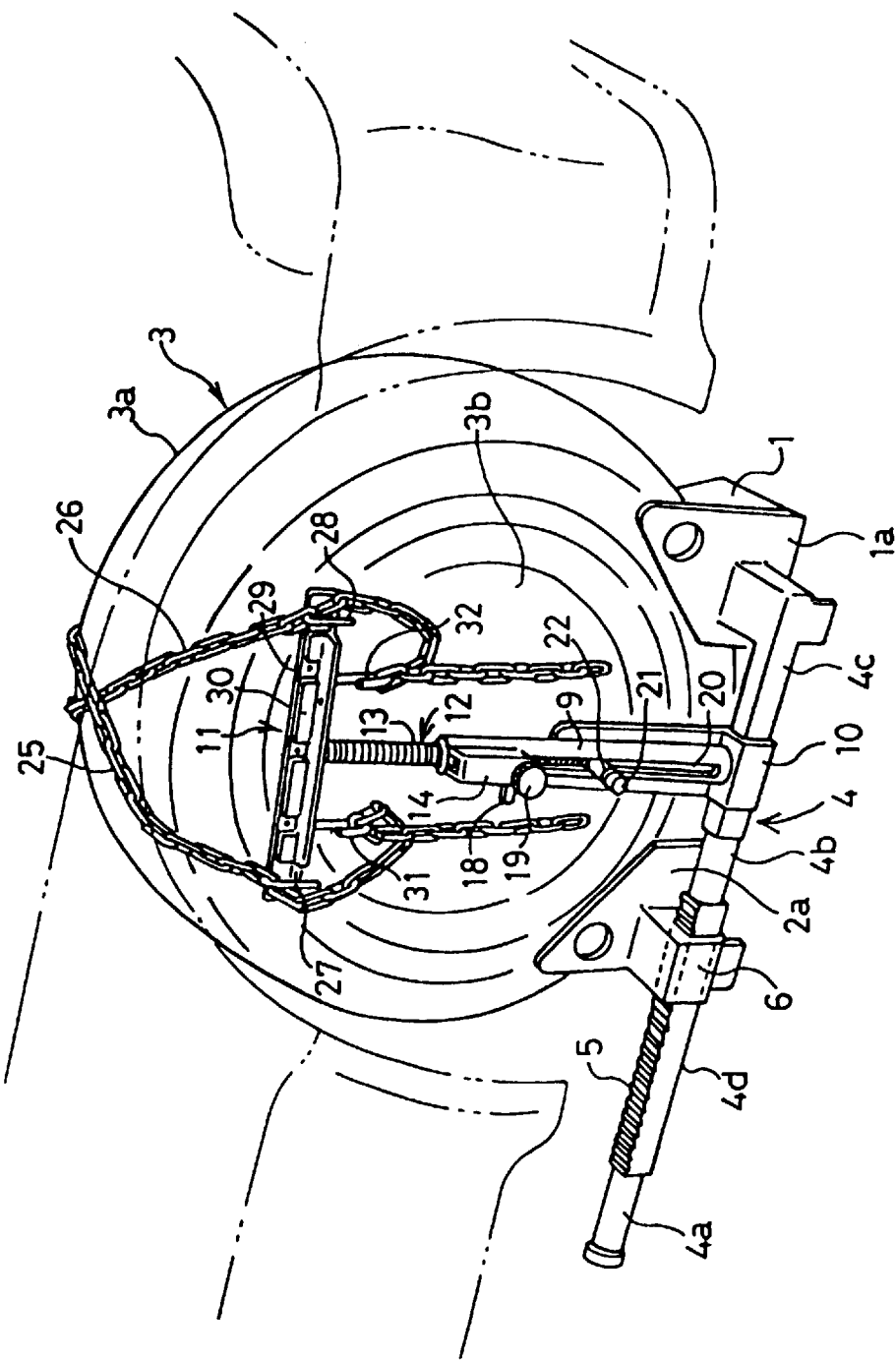
FIG. 4 is an external perspective view of the vehicle detention device according to the first embodiment of the invention when being secured to an objective wheel.
Figure 5:
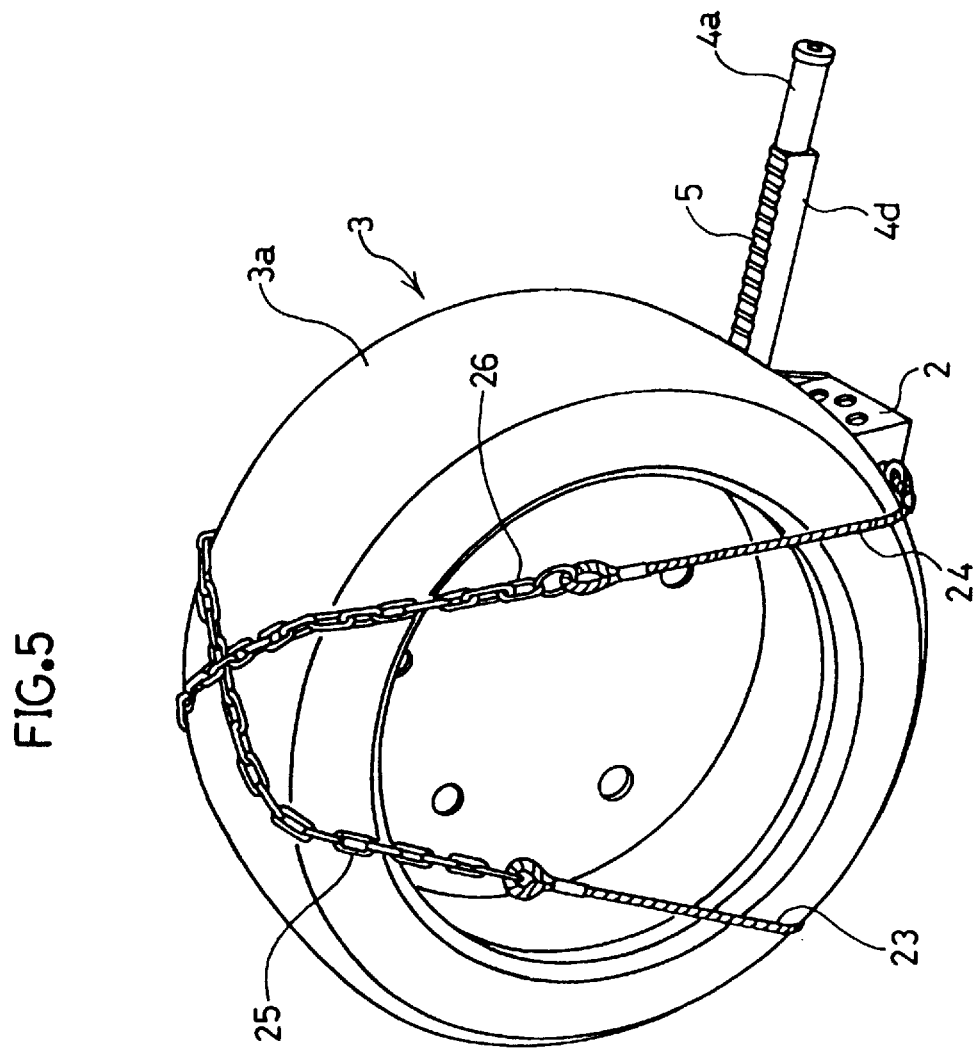
FIG. 5 is an internal perspective view of the vehicle detention device according to the first embodiment of the invention when being secured to an objective wheel.

FIGS. 1 through 8 respectively designate the fundamentals of the vehicle detention device according to the first embodiment of the invention, in which the reference numerals 1 and 2 respectively designate a pair of wedge-like stopper blocks which jointly inhibit an objective wheel 3 from rotatively moving itself in the forward and backward directions by way of coming into contact with a tire 3a of the wheel 3 at both sides of a point, where the tire makes contact with the road surface and against the rotating direction of the wheel 3. The stopper block 2 is so arranged that it can shift itself by long and short distances against the other stopper block 1. To effectuate this structural arrangement, the stopper block 1 is secured to an end of a horizontally extended guide shaft 4, whereas the other stopper block 2 is movable itself along longitudinal direction of the guide shaft 4 and subject to be locked as of the state in contact with the tire 3a.

More particularly, the guide shaft 4 has a longitudinal end 4a and a center member 4b each having circular section, whereas other longitudinal member 4c and 4d are respectively of square sectional form. Multistep teeth 5 are formed in the longitudinal direction of the guide shaft 4 at equal pitches on the top surface of the square-sectional member 4d between the longitudinal end 4a and the center member 4b. A casing 6 integrated with the stopper block 2 envelops part of the square-sectional member 4d. The casing 6 accommodates a locking claw 7 engageable with the multistep teeth 5. The locking claw 7 climbs over the multistep teeth 5 when the stopper block 2 shifts itself in the direction closer to the stopper block 1 to come into engagement with the multistep teeth 5 when the other stopper block 2 shifts in the direction apart from the stopper block 1. The casing 6 also accommodates an unlocking preventive member 8 which prevents the locking claw 7 from being disengaged from the multistep 5 by act of inserting a thin measure or the like via clearance between the square-sectional member 4d and the casing 6.

In order to shift the stopper block 2 towards the longitudinal end 4a of the circular-sectional portion of the guide shaft 4, initially, while the stopper blocks 1 and 2 are apart from the objective wheel 3, the casing 6 is once shifted to the circular-sectional center member 4b in conjunction with the stopper block 2. Next, the casing 6 is rotated by 90 degrees around the guide shaft 4 in conjunction with the stopper block 2 before positioning the locking claw 7 onto part of surface of the guide shaft 4 devoid of the multistep teeth 5. Then, the casing 6 is shifted towards the circular-sectional longitudinal end 4a in conjunction with the stopper block 2. By effect of integrally turning the casing 6 together with the stopper block 2 shifted to the circular-sectional longitudinal end 4a around the guide shaft 4 and by effect of positioning the locking claw 7 onto the surface provided with the multistep teeth 5, the stopper block 2 can be moved in the direction to sandwich the wheel 3, in other words, the stopper block 2 can be moved towards the other stopper block 1.

The stopper blocks 1 and 2 are respectively provided with a plate body 1a and a plate body 2a respectively coming into contact with the external lateral surface of the tire 3a. The guide shaft 4 and the casing 6 enveloping part of the square-sectional member 4d of the guide shaft 4 are respectively secured to the external surfaces of the plate bodies 1a and 2a.

A cylindrical strut 9 is provided outside of the square-sectional member 4c between the longitudinal end of the guide shaft 4 and the circular-sectional center member 4b. A rectangular cylindrical member 10 set to bottom position is coupled with the cylindrical strut 9 by way of being movable in the longitudinal direction of the guide shaft 4. A vertical shaft 12 is vertically inserted in the cylindrical strut 9 below an elevating body portion 11 forming a T-shape in the front view. Multistep teeth 13 are formed on external surface of the downwardly extended vertical shaft 12 along longitudinal direction at equal pitches. A locking claw 15 provided inside of a casing 14 secured to the upper end of the cylindrical strut 9 comes into engagement with the multistep teeth 13 in order that the elevating body 11 can be positioned at an optional height position. More particularly, a tip portion of the locking claw 15 is supported at upper portion inside of the casing 14 via a horizontal pin 16, whereas a bottom claw 15a is biased in the direction of engagement with the multistep teeth 13 by means of a spring 17. A lever 18 externally projects from the casing 14, where the lever 18 is integrated with the locking claw 15. The claw 15a set to the bottom of the locking claw 15 is disengaged from the multistep teeth 13 by pulling the lever 18 towards operator side in resistance against biasing force of the spring 17. Since the claw 15a at the bottom of the locking claw 15 is fixed in engagement with the multistep teeth 13, a fastening member 19 is provided in order to cause tip of the fastening member 19 inserted in the casing 14 to press the bottom edge of the locking claw 15 in the direction engageable with the multistep teeth 13. An aperture 20 is formed in the vertical direction of the cylindrical strut 9. An engaging shaft 21 is inserted in the bottom end of the shaft 12. An engaging groove 22 of the engaging shaft 21 projects from the aperture 20 to enable a key-provided rotary hook of a cover unit to come into engagement with the engaging groove 22 as will be described later on. A pair of wires 23 and 24 are respectively secured to the interior of the stopper blocks 1 and 2 by way of having one ends respectively being connected to the interior of the stopper blocks 1 and 2. The other ends of the wires 23 and 24 are respectively connected to one ends of a pair of chains 25 and 26. The wires 23 and 24 respectively have specific length enough to externally and internally sandwich the bottom end of the tire 3a of the wheel 3 between the plate bodies 1a and 2a while the tire 3a is sandwiched at both sides of a point where the tire contact the ground surface and against the rotating direction of the wheel 3 by means of the stopper blocks 1 and 2. Chains 25 and 26 connected to the other ends of the wires 23 and 24 are respectively extended from the tip end to the external side of the tire 3a, whereas the other ends of the chains 25 and 26 are respectively caught by a pair of hooks 27 and 28 provided on the top ends of the elevating body portion 11 which forms the T-shape in the front view. More particularly, the top domain of the elevating body 11 consists of an L-shaped sectional horizontally extended plate 29 being orthogonal to the shaft 12 and another L-shaped horizontally extended plate 30 having a plate member 30a which is secured to the plate 29 across a clearance, where the plate member 30a faces in a vertical direction of an external surface of a plate member 29a which faces in a vertical direction of the plate 29. A pair of hooks 27 and 28 are provided on external surface at both ends of the plate member 29a facing in a vertical direction of the plate 29. A pair of hooks 31 and 32 are secured to the bottom surface of a plate member 29b facing horizontal in a direction of the plate 29. Surplus portions of the other ends of the chains 25 and 26 are respectively hung on the hooks 31 and 32.

Figure 6:
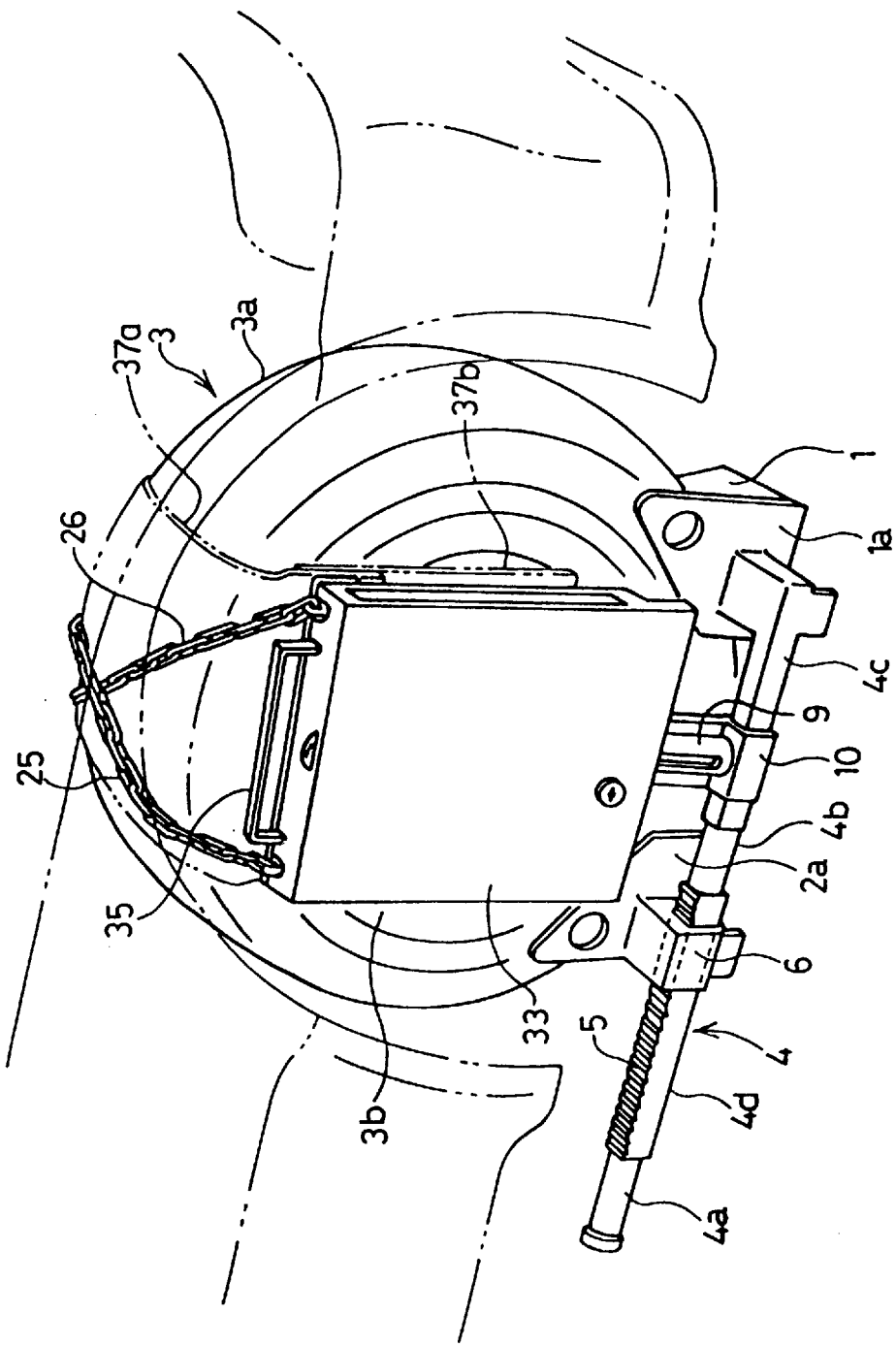
FIG. 6 is an external view of the vehicle detention device according to the invention after fully being secured to an objective wheel.
Figure 7:
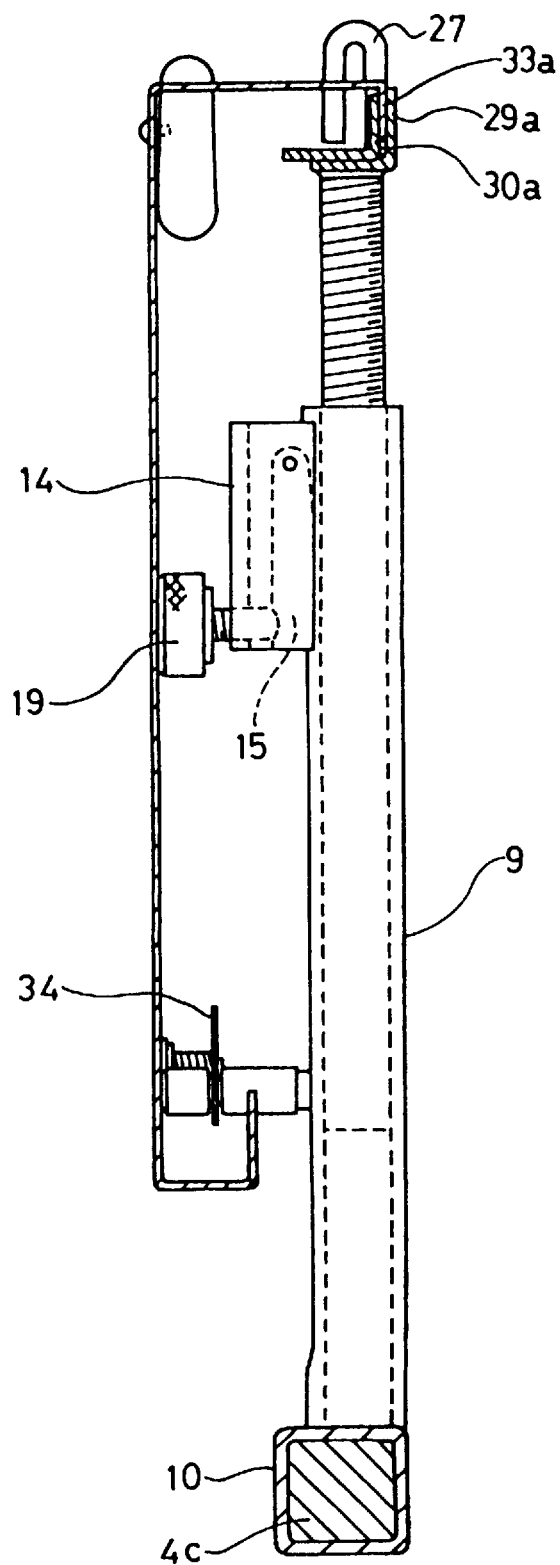
FIG. 7 is a cross-sectional view of cover-fixing mechanical components.
Figure 8:
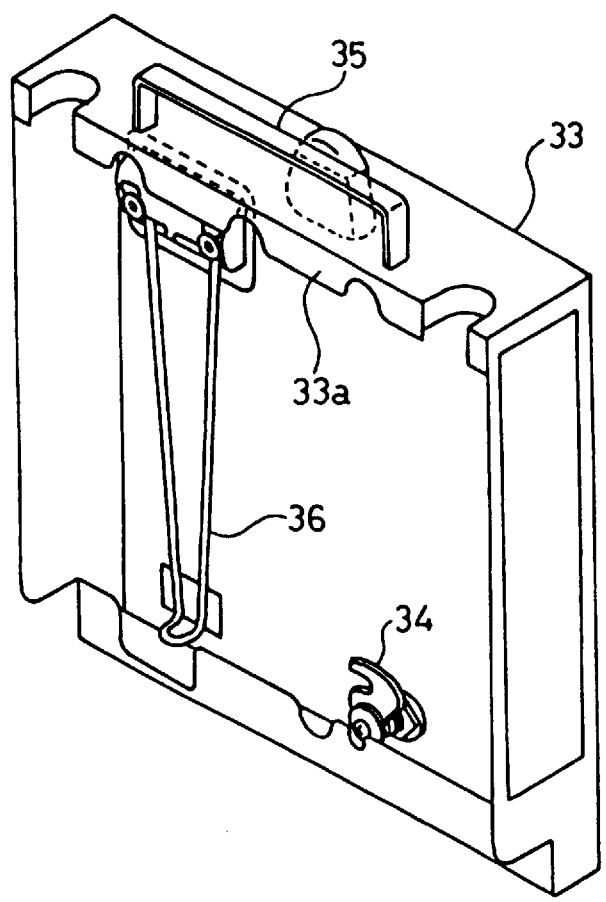
FIG. 8 is an internal perspective view of a cover unit.

The reference numeral 33 shown in FIGS. 1, 6 and 8 designates a cover unit for concealing the above-stated mechanism ranging from the bottom side of the cylindrical strut 9 to the top end of the elevating body 11. A folded member 33a provided inside of the top domain of the cover unit 33 comes into engagement with a clearance between the plate member 29a and the plate member 30a from the top side. A rotary hook 34 engageable with the engaging groove 22 of the engaging shaft 21 is provided inside of the cover unit 3. The rotary hook 34 is operated by a locking key inserted from the exterior of the cover unit 33. The reference numeral 35 designates a handle set to the top surface of the cover unit 33. The reference numeral 36 designates a stand unit for erecting the cover unit 33 before being secured to the fundamental components of the vehicle detention device.

Next, a practical method of effectuating detention of an objective wheel of a vehicle using the inventive vehicle detention device complete with the above-stated mechanical structure is described below.

Initially, a pair of wedge-like stopper blocks 1 and 2 integrated with a guide shaft 4 are respectively brought to positions close to an objective wheel 3. Next, the stopper block 2 is shifted along the guide shaft 4 in the direction closer to the stopper block 1. Next, the stopper blocks 1 and 2 are brought into contact with an objective tire 3a at both sides of a point where the tire contacts a road surface and against the rotating direction of the wheel 3. When stopper blocks 1 and 2 are so placed, a cylindrical strut 9 is positioned at the center point between the stopper blocks 1 and 2, in other words, at the center of the forward-backward direction of the wheel 3. Next, using a pair of wires 23 and 24, the bottom edge of the tire 3a is externally and internally sandwiched between a plate 1a and a plate 2a of the stopper blocks 1 and 2, and then, a pair of chains 25 and 26 connected to the other ends of the wires 23 and 24 are extended over the exterior of the wheel 3 by way of crossing the chains 25 and 26 via X-shape at the tip end of the tire 3a, whereas the other ends of the chains 25 and 26 are respectively hung on a pair of hooks 27 and 28 set to the tip ends of an elevating body 11. While the above operation is underway, fastening force of a fastening member 19 is slackened to position the elevating body 11 as high as possible against the strut 9 so that the other ends of the chains 25 and 26 can easily be hung on the hooks 27 and 28. Next, the elevating body 11 is lowered in order that the wheel 3 can be fastened so closely with the wires 23 and 24 in association with the chains 25 and 26. As a result of fastening by the fastening member 19, a claw member 15a at the bottom end of locking claw 15 is closely engaged with multistep teeth 13 of a shaft 12. Next, surplus portions of the chains 25 and 26 are respectively hung on a pair of hooks 31 and 32. After the ends of chains 25 and 26 are hung, mechanical components ranging from the bottom portion of the strut 9 to the tip of the elevating body 11 are fully concealed by externally securing a cover unit 33 onto them. Finally, by externally operating a locking key provided for the cover unit 33, a rotary hook 34 is engaged with an engaging groove 22 of an engaging shaft 21.

As shown in FIG. 6, it is also permissible for an operator to provide a pair of shielding sheets 36 and 37 made from vinyl or the like (designated by double-dotted chain lines) on the tip end of the elevating body 11 in order to prevent the tire 3a and the wheel 3b from incurring unwanted damage. Furthermore, in order to more securely effect detention of the objective wheel 3, it is optionally possible for an operator to bond the crossing members of the chains 25 and 26 at the tip of the tires 3a with a locking key.

The state of detention effected by the inventive novel vehicle detention device can be released by reversing the steps for restraining the wheel 3 thus far described.

Therefore, according to the first embodiment of the invention, using a pair of chains 25 and 26, an objective wheel 3 is fastened and restrained while a pair of stopper blocks 1 and 2 are brought into contact with the tire 3a at both sides of a point where the tire makes contact with a road surface and against the rotating direction of the wheel 3, and yet, fundamental components for releasing the state of detention are fully concealed by a key-provided cover unit 33. In consequence, no one can readily remove the inventive vehicle detention device from the wheel 3 without operating a proper key, and therefore, the objective vehicle can securely be maintained under detention. Furthermore, the vehicle detention device according to the first embodiment of the invention is characterized by a simple structure permitting an operator to easily secure the device onto an objective wheel 3 to effect detention of a vehicle, while providing a vehicle detention device at a low cost.

Next, referring now to FIG. 9 through 17, the novel vehicle detention device according to the second embodiment of the invention is described below. The reference numerals 41 and 42 respectively designate a pair of wedge-like stopper blocks, which respectively come into engagement with a tire 43a of an objective wheel 43 at both sides of a point where the tire makes contact with a road surface and against the rotating direction of the wheel 43 in order to inhibit the wheel 43 from rotating in the forward and backward directions. The stopper block 42 can be shifted apart from the other stopper block 41 by long and short distances. To effectuate this structural arrangement, the stopper block 41 is secured to an end of a horizontally extended cylindrical body 44, whereas the stopper block 42 is secured to an end of a slidable shaft 45 having the other end being capable of freely entering into and moving out of the other end of the cylindrical body 44.

More particularly, except for the circular-sectional end on the part of the stopper block 42, the slidable shaft 45 is of square-sectional form. Multistep teeth 46 are formed on the top surface of a square-sectional member 45a in the longitudinal direction at equal pitches. A locking claw 47 is provided inside of the other end of the cylindrical body 44. The locking claw 47 climbs over the multistep teeth 46 when the stopper block 42 shifts itself in the direction closer to the stopper block 41. The locking claw 42 comes into engagement with the multistep teeth 46 when the stopper block 42 shifts itself in the direction apart from the stopper block 41. An unlocking preventive member 48 is provided inside of the other end of the cylindrical body 44. The unlocking preventive member 48 prevents the locking claw 47 from being disengaged from the multistep teeth 46 by act of tampering, for example, inserting a thin measure or the like via clearance between the square-sectional member 45a and the cylindrical body 44.

In order to shift the stopper block 42 in the direction apart from the other stopper block 41, initially, while the stopper blocks 41 and 42 are apart from the objective wheel 43, the slidable shaft 45 is shifted in conjunction with the stopper block 42 until the slidable shaft 45 is fully inserted in the cylindrical body 44. Then, in conjunction with the stopper block 42, the slidable shaft 45 is turned by 90 degrees inside of the cylindrical body 44 before positioning the multistep teeth 46 right on the surface devoid of the locking claw 47. While turned by 90 degrees, the slidable shaft 45 is shifted in the direction to draw the shaft 45 out of the cylindrical body 44 together with the stopper block 42. Subsequent to the positioning of the multistep teeth 46 right on the surface provided with the locking claw 47 by inversely turning the slidable shaft 45 and the stopper block 42 by 90 degrees, the stopper block 42 can be shifted in the direction to sandwich the wheel 43, in other words, the stopper block 42 can be shifted towards the other stopper block 41.

The stopper blocks 41 and 42 are respectively provided with a plate member 41a and a plate member 42a which respectively come into contact with external surface of the tire 43a. External surfaces of the plate members 41a and 42a are respectively secured to an end of the cylindrical body 44 and the other end of the slidable shaft 45.

A cylindrical strut 49 is erected inside of the cylindrical body 44 at a position slightly close to an end, apart from the center of the longitudinal direction of the cylindrical body 44. The cylindrical strut 49 is reinforced by means of a reinforcing member 50 having ]-shaped horizontal section. An elevating body 51 having a vertical shaft member 42, the combination having a T-shape in the front view is inserted in the cylindrical strut 49 from the top side thereof. Multistep teeth 53 are formed on external surface of the vertical shaft member 52 in the longitudinal direction at equal pitches. A locking claw 55 accommodated in a casing 54 secured to upper portion of the cylindrical strut 49 is engaged with the multistep teeth 53 so that the elevating body 51 can be positioned at an optional height position inside of the casing 54 by means of a horizontal pin 56, whereas a claw member 55a at the bottom end comes into engagement with the multistep teeth 53, where the claw member 55a is energized in the direction engageable with the multistep teeth 53 by means of a spring 57. A lever 58 is integrally provided with the locking claw 53 by way of projecting itself from the casing 54. By effect of pulling the lever 58 towards an operator side in resistance against the biasing force of the spring 57, the claw member 55a at the bottom end of the locking claw 55 can be disengaged from the multistep teeth 53. In order to permit the claw member 55a at the bottom end of the locking claw 55 to be fixed in place while being engaged with the multistep teeth 53, a fastening member 59 presses the bottom end of the locking claw 55 in the direction engageable with the multistep teeth 53 by means of the tip end thereof inserted in the casing 54. When the fastening member 59 is turned to the right, the fastening condition is entered. An aperture 60 is formed in the cylindrical strut 49 in the vertical direction. A tip end of an engaging shaft 61 is inserted in the bottom end of a shaft member 62. An engaging groove 62 of the engaging shaft 61 is provided by way of projecting from the aperture 60. A key-provided rotary hook, (to be described hereinafter) is engageable with the groove 62.

A pair of wires 63 and 64 are respectively secured to the interior of the stopper blocks 41 and 42 by way of having one ends respectively being connected to the interior thereof. The other ends of the wires 63 and 64 are respectively connected to one ends of a pair of chains 65 and 66. The wires 63 and 64 respectively have specific length enough to externally and internally sandwich the bottom end of the tire 43a of the wheel 43 between the plate members 41a and 42a while the tire 43a is sandwiched at both sides of a point where the tire makes contact with a road surface and against the rotating direction of the wheel 43 by means of the stopper blocks 41 and 42. The chains 65 and 66 respectively being connected to the other ends of the wires 63 and 64 are extended from the tip end to the exterior of the tire 43a, whereas the other ends of the chains 65 and 66 are respectively caught by a pair of hooks 67 and 68 provided on the top end of the elevating body 51 having T-shape in the front view. More particularly, the top end of the elevating body 51 consists of an L-shaped sectional horizontally extended plate 69 being orthogonal to the shaft 52 and another L-shaped sectional horizontally extended plate 70 having a plate member 70a being secured to the plate 69 across clearance, where the plate member 70a faces the vertical direction of the external surface of the plate member 69. A pair of hooks 67 and 68 are provided on external surfaces at both ends of the plate member 69 facing the vertical direction of the plate member 69. A pair of hooks 71 and 72 are secured to the bottom surface of a plate member 69a facing the vertical direction of the plate 69. Surplus portions of the other ends of the chains 65 and 66 are respectively hung on the hooks 71 and 72.

Figure 9:
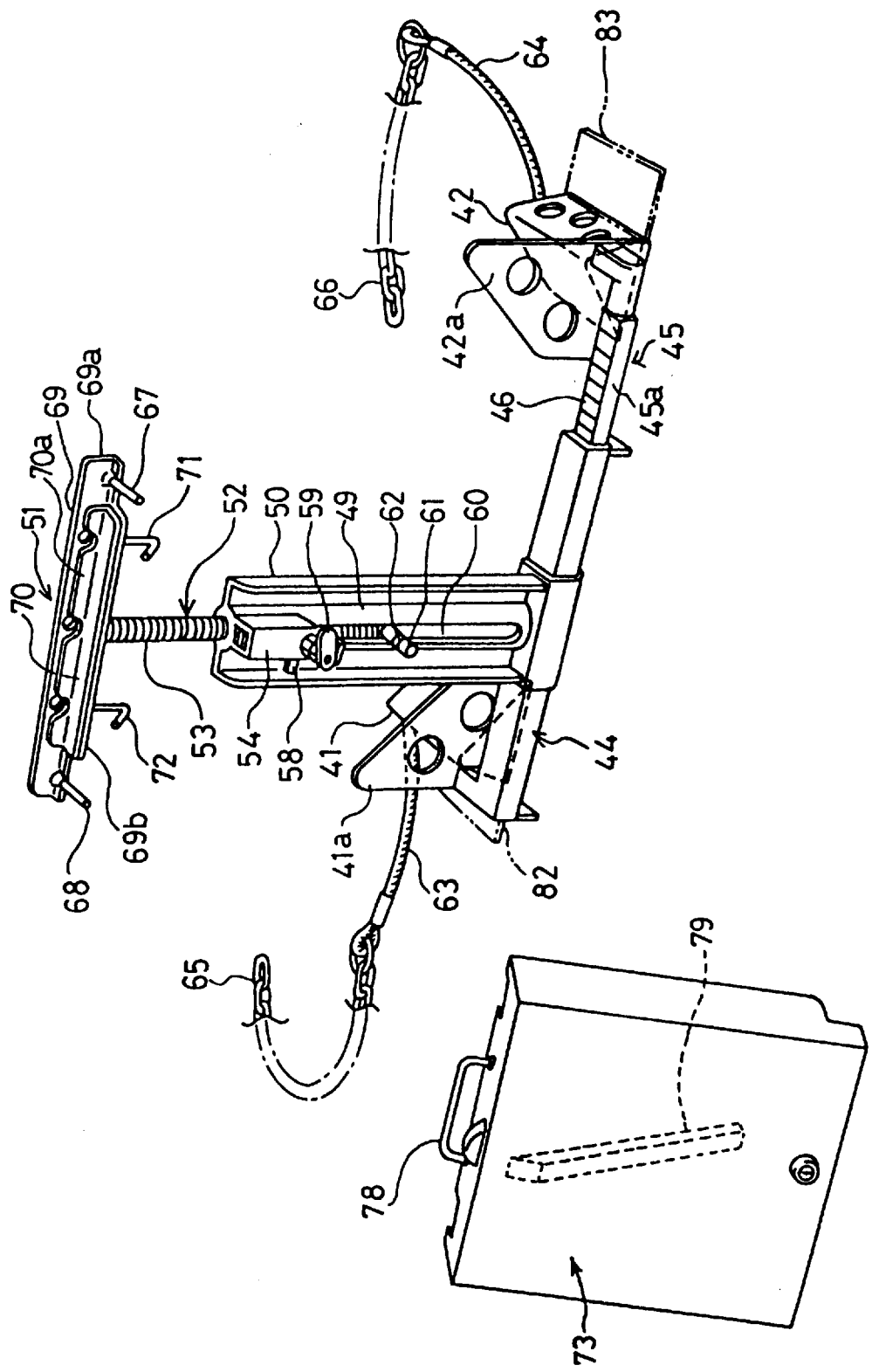
FIG. 9 is an overall perspective view of the vehicle detention device according to the second embodiment of the invention.
Figure 10:
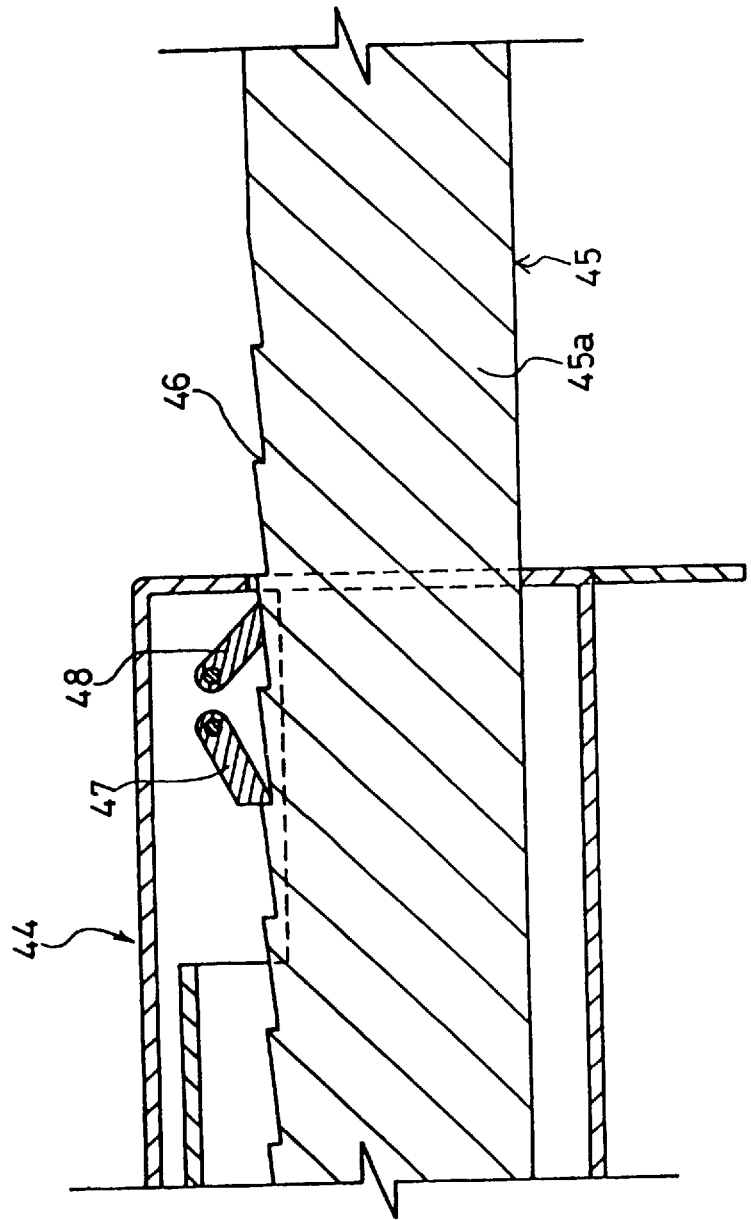
FIG. 10 is a cross-sectional view representing the relationship between a slidable shaft and a locking claw provided inside of a cylindrical body.
Figure 11:
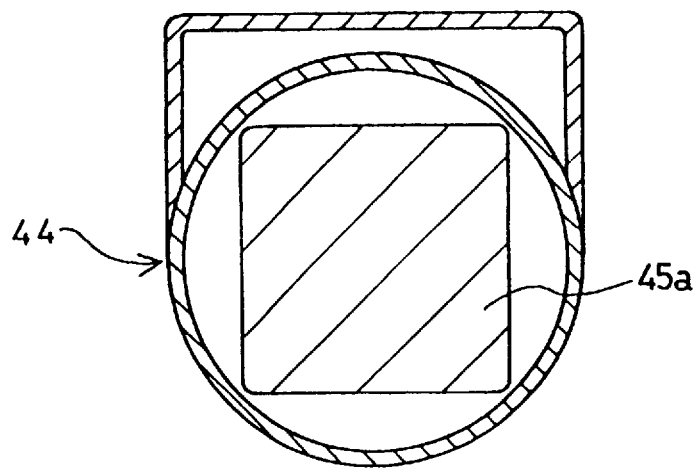
FIG. 11 is a cross-sectional view representing the relationship between the slidable shaft and the cylindrical body.
Figure 12:
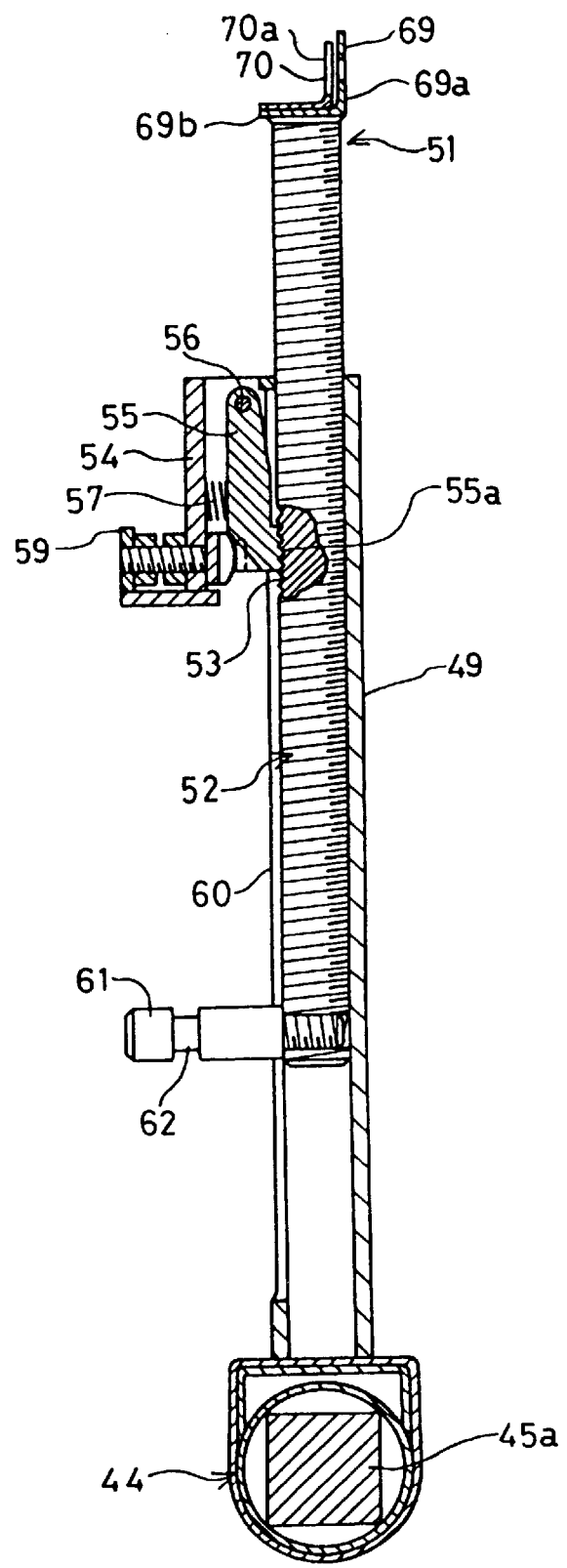
FIG. 12 is a cross-sectional view representing the relationship between a shaft of an elevating body and a strut.
Figure 13:
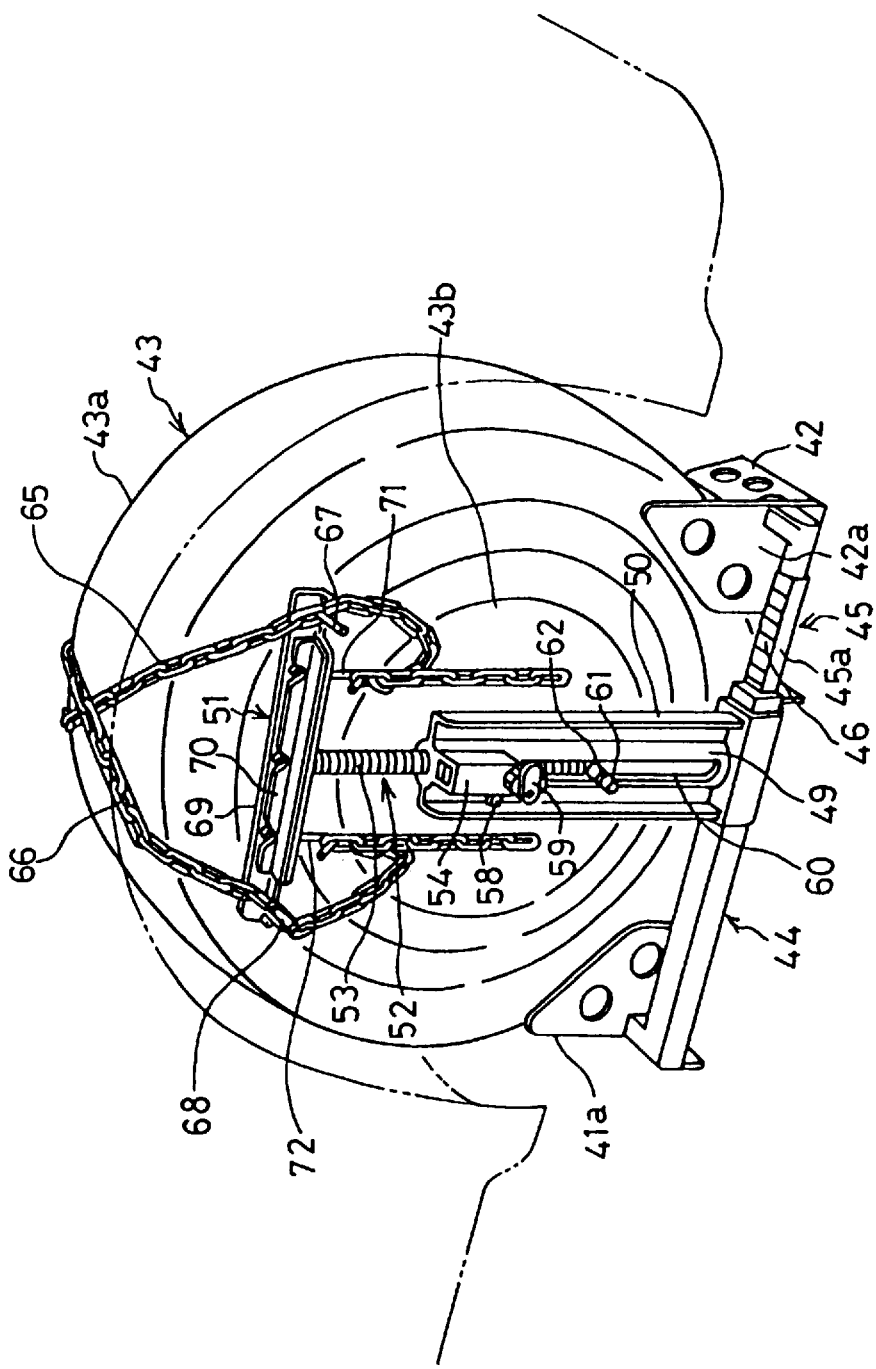
FIG. 13 is an external perspective view of the vehicle detention device according to the second embodiment of the invention on the way of being secured to an objective wheel.
Figure 14:
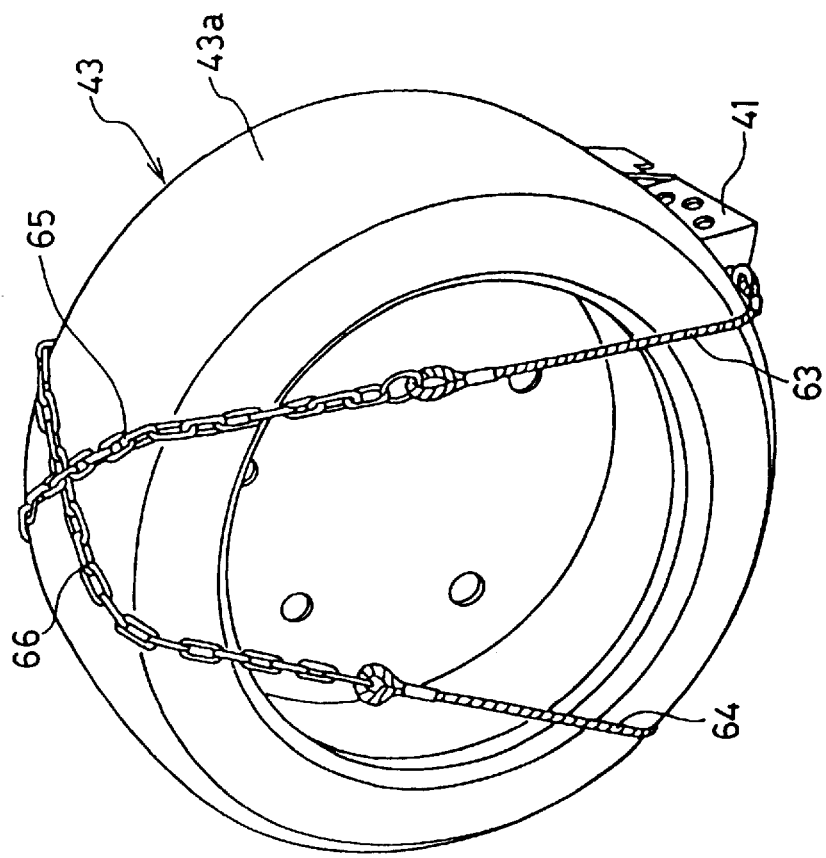
FIG. 14 is an internal perspective view of the vehicle detention device, according to the second embodiment of the invention, being secured to an objective wheel.
Figure 15:
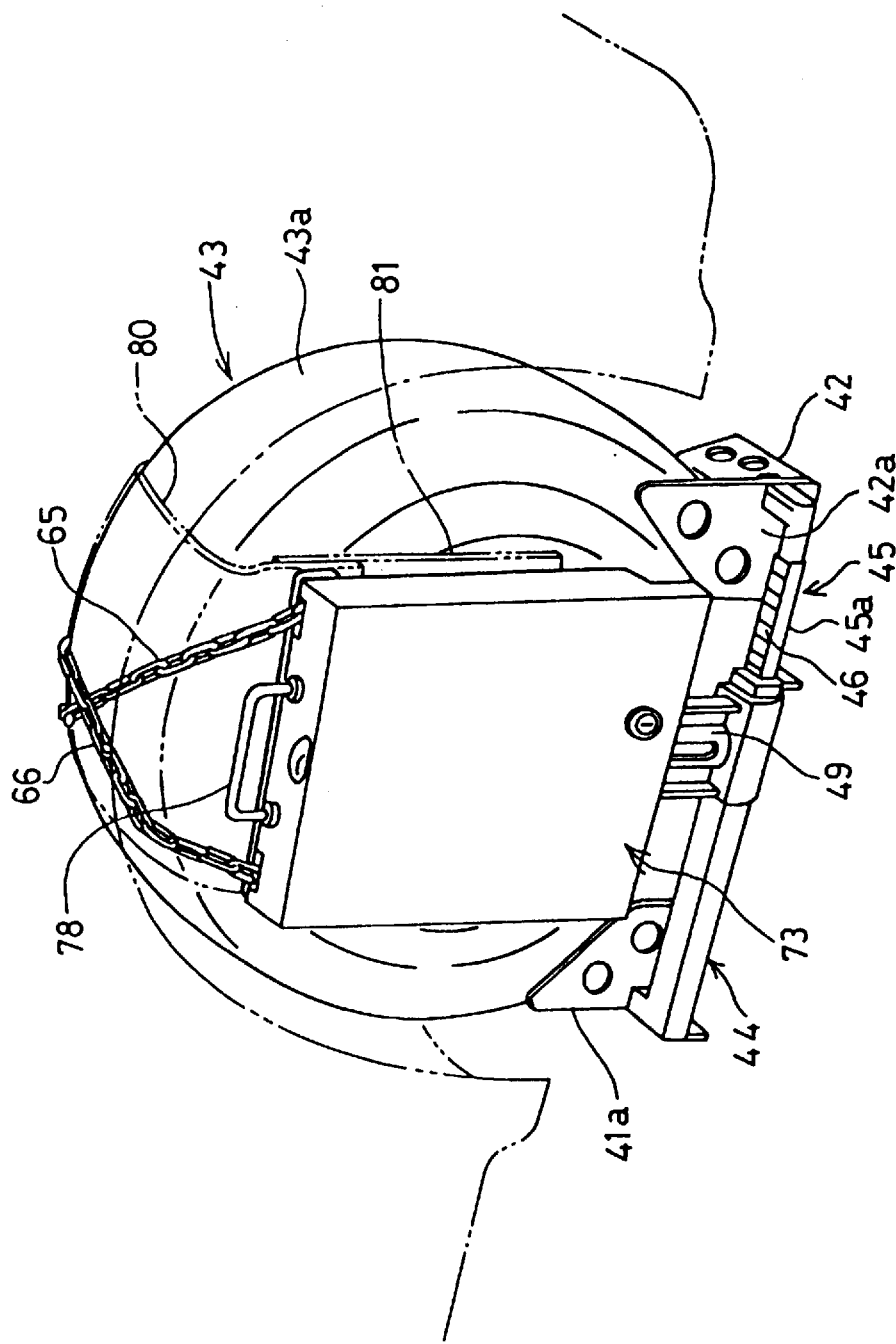
FIG. 15 is an external perspective view of the vehicle detention device according to the second embodiment of the invention after fully being secured to an objective wheel.
Figure 16:
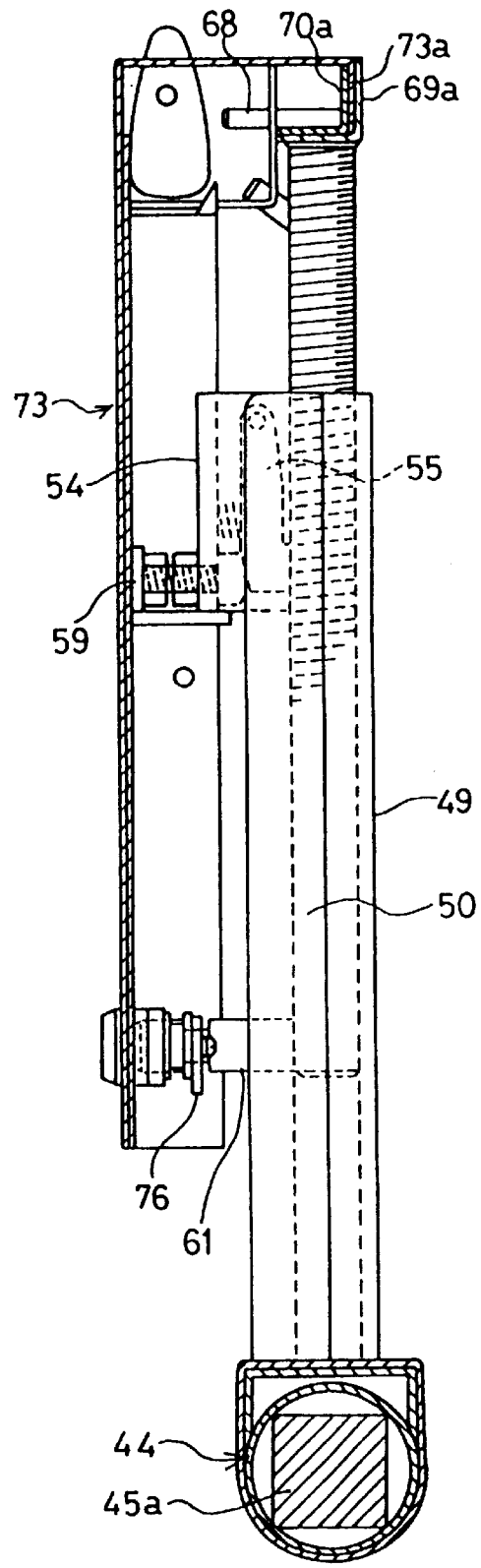
FIG. 16 is a cross-sectional view of cover-fixing components.
Figure 17:
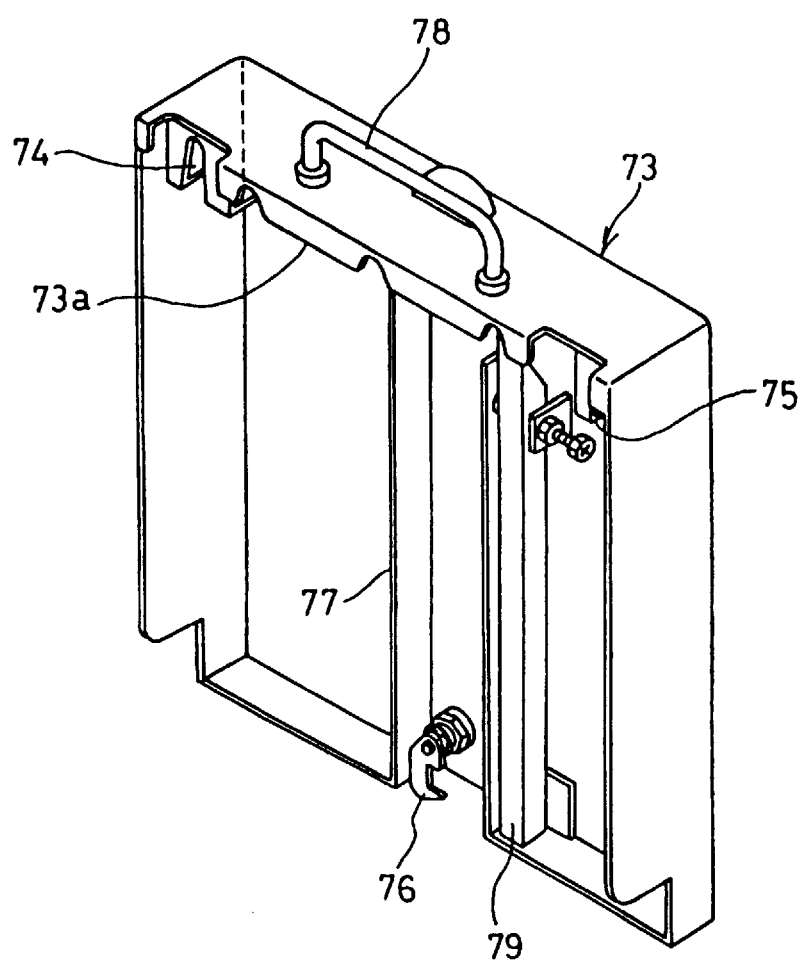
FIG. 17 is an internal perspective view of a cover unit.

The reference numeral 73 shown in FIGS. 9, 15, and 17 designates a cover unit for fully concealing the above-stated fundamental components ranging from the bottom side of the cylindrical strut 49 to the top ed of the elevating body 51. A folded member 73a provided inside of the tip end of the cover unit 73 comes into engagement with a clearance between the plate member 69a and the other plate member 70a from the top side. A pair of grooves 74 and 75 are formed at the upper inside edges on both sides of the cover unit 73, where the grooves 74 and 75 are respectively engaged with the hooks 67 and 68 to effect positioning of the cover unit 73 on the way of securing the cover unit 73 onto the wheel detention mechanism. A rotary hook 76 engageable with the engaging groove 62 of the engaging shaft 61 is provided inside of the bottom end of the cover unit 73 at the center position of the lengthwise direction thereof. The rotary hook 76 is operated by means of a locking key inserted from the exterior of the cover unit 73. The reference numeral 77 designates a pair of plate members provided on the internal surface of the cover unit 73 at the center position of the widthwise direction thereof in order to sandwich the cylindrical strut 49 from both sides while the cover unit 73 is secured to the elevating body 51 and the strut 49. While the fastening member 59 is out of the fastening operation, one of the plate members 77 remains in contact with the fastening member 59 to inhibit fixation of the cover unit 73. The cover unit 73 can properly be secured to the elevating body 51 and the cylindrical strut 49 while the fastening member 59 is turned to the right to effectuate a fastening operation. The reference numeral 78 designates a carrying handle secured to the top surface of the cover unit 73. The reference numeral 79 designates a stand unit to erect the cover unit 73 before securing the cover unit 73 to the elevating body 51 and the cylindrical strut 49.

Next, a practical method of effectuating detention of an objective vehicle by means of the inventive vehicle detention device according to the second embodiment of the invention being characterized by the above structure is described below. Initially, the vehicle detention device is brought to a position very close to the objective wheel 43, and then, in the course of inserting the slidable shaft 45 into the cylindrical body 44, the stopper block 42 is shifted in the direction close to the other stopper block 41. Next, the stopper blocks 41 and 42 are respectively brought into contact with the tire 43a at both sides of a point where the tire makes contact with a road surface and against the rotating direction of the wheel 43. When stopper blocks 1 and 2 are in place, position for securing the strut 49 onto the cylindrical body 44 is established in order that the strut 49 can be set to the center position between the stopper blocks 41 and 42, in other words, substantially at the center of the forward-backward direction of the wheel 43. The bottom end of the tire 43a is then internally and externally sandwiched by the stopper blocks 41 and 42 by means of the wires 63 and 64. The chains 65 and 66 connected to the other ends of the wires 63 and 64 are then respectively extended over the exterior of the wheel 43 by way of crossing the chains 65 and 66 via X-shape at the top end of the tire 43a. Next, the other ends of the chains 65 and 66 are respectively hung on the hooks 67 and 68 provided on the top side of the elevating body 51. At the same time, the elevating body 51 is positioned as high as possible against the strut 49 while fastening member 59 remains loose in order that the other ends of the chains 65 and 66 can easily be hung on the hooks 67 and 68. Next, the elevating body 51 is lowered in order that the wheel 43 can be fastened very closely by means of the wires 63 and 64 in collaboration with the chains 65 and 66. Next, the fastening member 59 is operated to exert a fastening effect to cause the claw member 55a to come into close engagement with the multistep teeth 53 formed on the shaft member 52. Next, surplus portions of the other ends of the chains 65 and 66 are respectively hung on the hooks 71 and 72, and then, mechanical components ranging from the bottom portion of the strut 49 to the top portion of the elevating body 51 are fully concealed by securing the cover unit 73 upon them. Finally, the rotary hook 76 is engaged with the engaging groove 62 of the engaging shaft 61 by way of operating a key from the exterior of the cover unit 73.

As shown in FIG. 15, it is permissible for operator to provide a pair of shielding sheets made from vinyl or the like (designated by double-dotted chain lines) on the top side of the elevating body 51 so that the tire 43a and the wheel 43b can be prevented from incurring unwanted damage. Furthermore, in order to more securely effectuate detention of the wheel 43, crossing members of the chains 65 and 66 at the tip end of the tire 43a may be bonded by means of a locking key. Furthermore, as shown in FIG. 9, a pair of externally projecting plates 82 and 83 may be provided on the bottom sides of the stopper blocks 41 and 42. By virtue of the provision of these plates 82 and 83 on both sides of the stopper blocks 41 and 42, even when a malfeasant attempts to drive the restrained vehicle by starting up the engine thereof while the wheel 43 is still held under detention, a road surface can be prevented from incurring unwanted damage otherwise caused by the bite of the stopper blocks 41 and 42.

The state of detention of the wheel effected by the vehicle detention device can be release by reversing the steps for restraining the wheel 43.

According to the second embodiment of the invention, the objective wheel 43 is fastened and restrained by the chains 65 and 66 while a pair of stopper blocks 41 and 42 are brought into contact with the tire 43a at both sides of a point where the tire makes contact with a road surface and against the rotating direction of the wheel 43, and yet, since fundamental components for freeing the state of detention are fully concealed by the cover unit 73 furnished with a key, no one can readily remove the invented vehicle detention device from the restrained wheel 43 without operating a proper key, thus making it possible for the device to securely retain the objective vehicle under detention. In addition, the vehicle detention device according to the second embodiment of the invention features simple structure to enable operator to readily secure the device onto the objective wheel 43 to effectuate detention of a vehicle, and yet, the invention provides the novel vehicle detention device at a low cost. The stopper block 41 is secured to an end of the cylindrical body 44, whereas the other stopper block 42 is secured to an end of the slidable shaft 45 having the other end being capable of freely entering into and moving out of the other end of the cylindrical body 44. Owing to this structural arrangement, while the objective vehicle is still held under detention, neither the cylindrical body 44 nor the slidable shaft 45 protrudes from the stopper blocks 41 and 42. For example, when a parked vehicle is restrained where the objective tire 43a is tilted against the running direction, pedestrians can be prevented from stumbling over the cylindrical body 44 or the slidable shaft 45 which would otherwise protrude.

Figure 18:
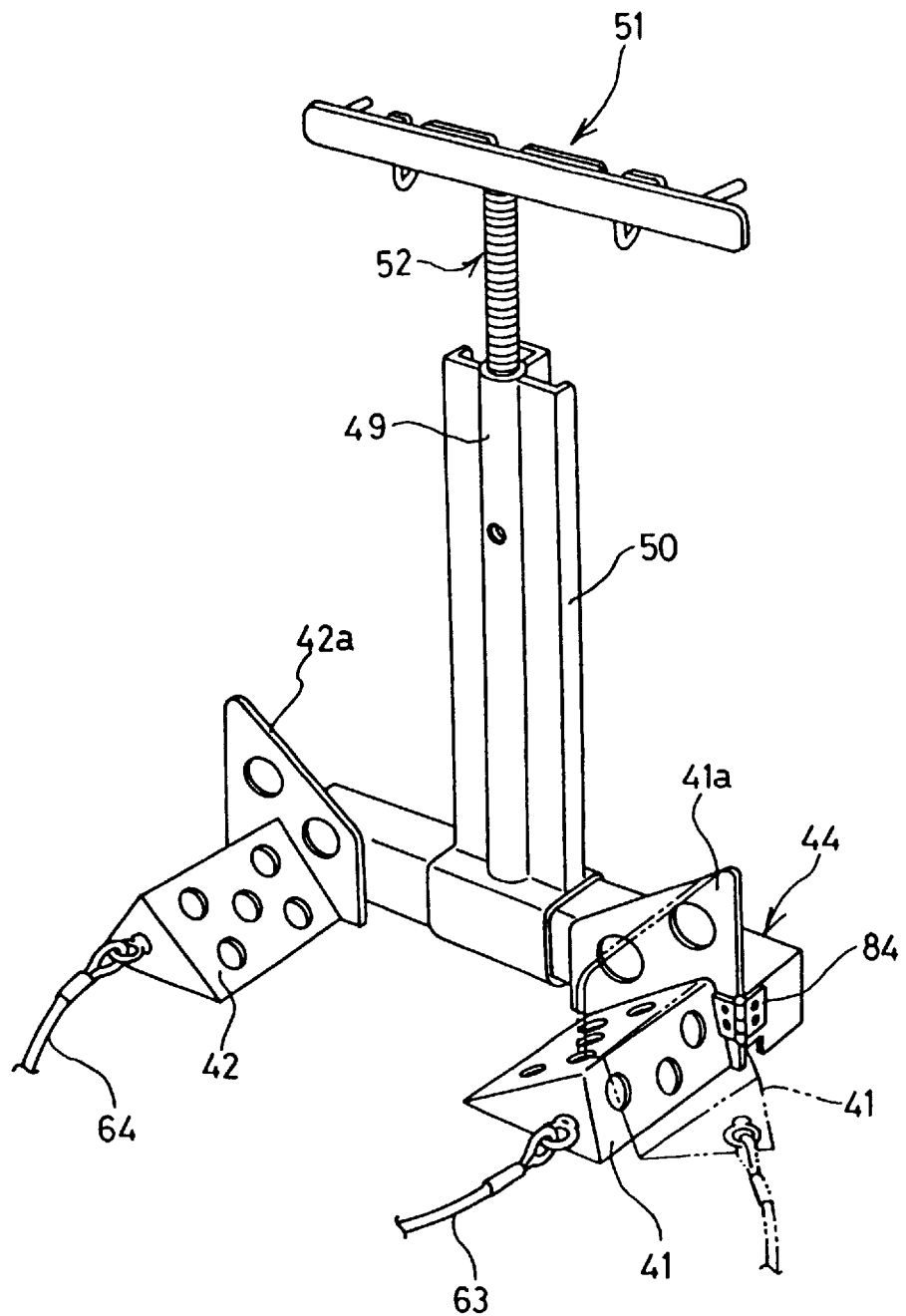
FIG. 18 is an overall perspective view of the vehicle detention device according to the third embodiment of the invention.

Next, referring to FIG. 18, the novel vehicle detention device according to the third embodiment of the invention is described below. In contrast with the second embodiment in which the stopper blocks 41 and 42 are respectively secured to the cylindrical body 44 and the slidable shaft 45, according to the third embodiment, the stopper block 41 is secured to the square-cylindrical body 44 via a hinge 84 so that the stopper block 41 can freely swing itself in the periphery of a vertical shaft. Except for this structural difference, other structural arrangements are identical to those of the second embodiment.

According to the third embodiment, in order to release the state of detention effected by the vehicle detention device of the invention, initially, the wheel 43 is released from the state of detention effected by the wires 63 and 64 in association with the chains 65 and 66. Next, the stopper block 41 is externally rotated in the periphery of a vertical shaft to facilitate removal of the vehicle detention device from the wheel 43. Even when releasing the tire 43a tightly bound by the stopper blocks 41 and 42 from the state of detention, by effect of turning the stopper block 41, the vehicle detention device can readily be disengaged from the wheel 43.

Figure 19:
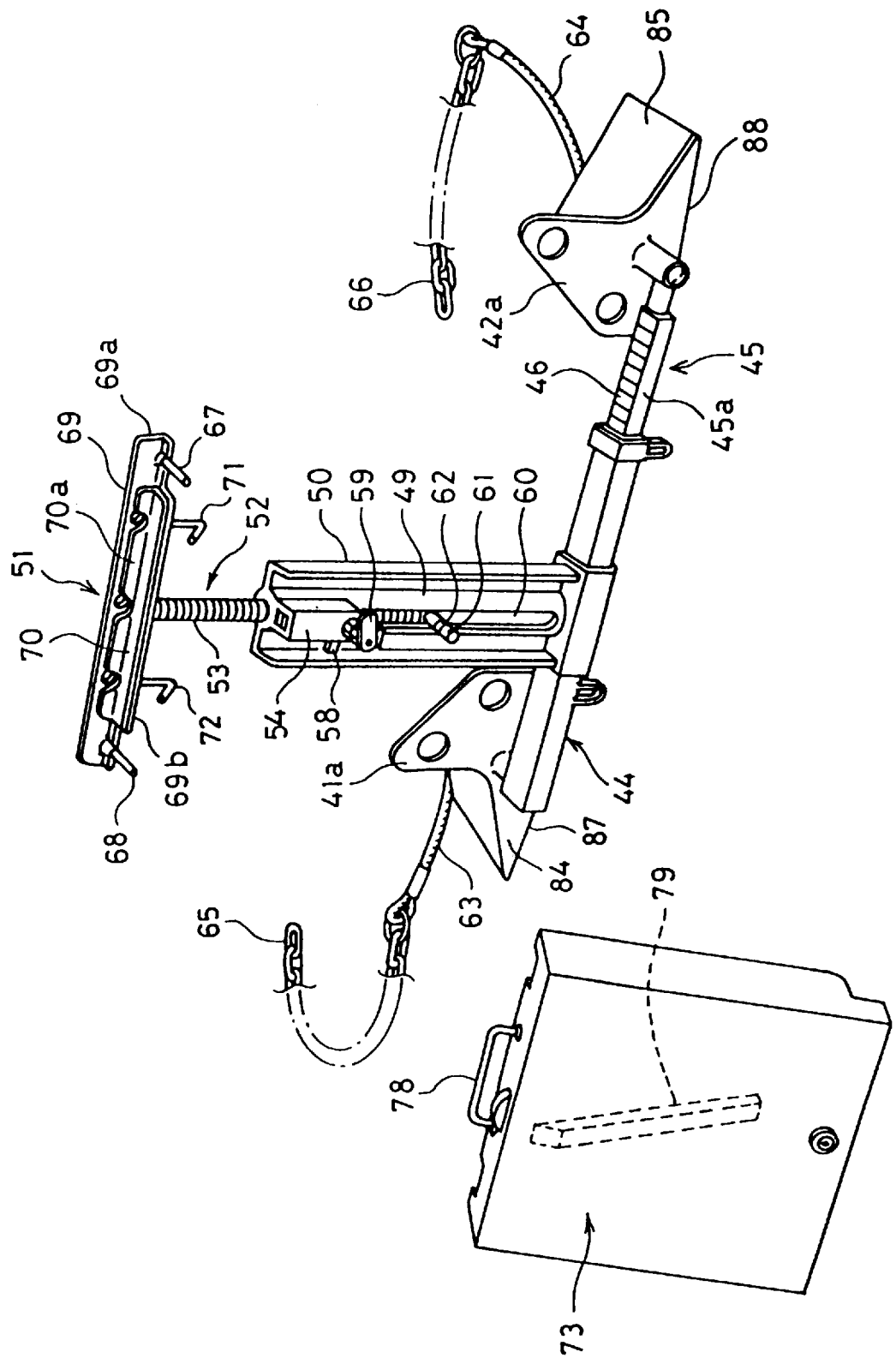
FIG. 19 is an overall perspective view of the vehicle detention device according to the fourth embodiment of the invention.
Figure 20:
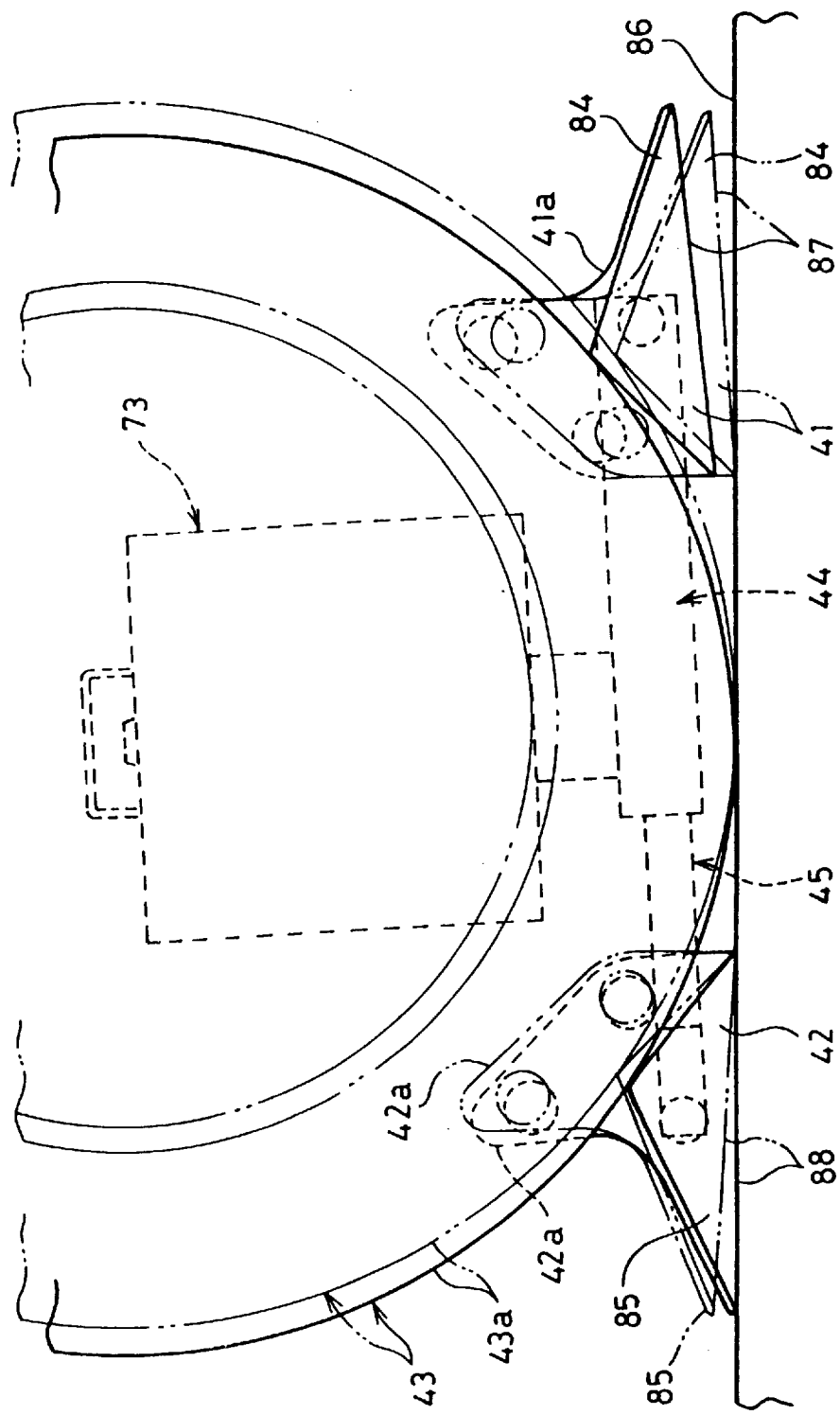
FIG. 20 is an enlarged view of fundamental components by way of designating relationship between stopper blocks and an objective wheel.

Next, referring to FIGS. 19 and 20, the vehicle detention device according to the fourth embodiment of the invention is described below. The fourth embodiment provides a pair of externally extended tapered members 84 and 85 respectively being integrated with the stopper blocks 41 and 42 made available for the second embodiment. In order that clearance can be formed between the tip ends of the externally extended tapered members 84 and 85 and road surface 86 while the vehicle detention device is secured to the wheel 43, a pair of surfaces 87 and 88 inclining themselves upward are provided on the bottom surfaces of the stopper block 41, the externally extended taped member 84, the other stopper block 42, and the other externally extended tapered member 85. Except for the provision of the externally extended tapered members 84 and 85 and the inclined surfaces 87 and 88, other mechanical arrangements are identical to those of the second embodiment.

The vehicle detention device according to the invention characterized by the above structural arrangements is secured to a front wheel 43 of a vehicle driven by geared rear wheels for example. When the engine of a vehicle held under detention is ignited, load from the front wheel 43 acts upon the stopper block 41 or the other stopper block 42 in the direction of the movement of the vehicle. More particularly, by effect of the shift of the center of gravity of the front wheel 43 to the stopper block 41 or the other stopper block 42 being in the direction of the movement of the vehicle, load acts upon the stopper block 41 or the other stopper block 42 being in the direction of the movement of the vehicle. As a result, the vehicle detention device inclines itself while the inclined surface 87 or 88 remains in contact with road surface 86. FIG. 20 illustrates the state in which the stopper block 42 receives a load from the front wheel 43. A load causes the vehicle detention device to incline itself to generate close contact between the stopper block 42 and the externally extended tapered member 85 integrated therewith and road surface 86 by fully eliminating clearance therebetween. With clearance eliminated, the front wheel 43 and the vehicle detention device secured to the front wheel 43 slidably move themselves on road surface 86. Therefore, even if the vehicle is driven, the vehicle detention device does not rotate preventing the driven vehicle from incurring unwanted damage.

What is claimed is:

1. A vehicle detention device for preventing movement of an objective vehicle comprising:

a first stopper block secured to a first body end of a horizontally extended cylindrical body;

a second stopper block secured to a first shaft end of a slidable shaft having a second shaft end capable of freely entering into and moving out of a second body end of said cylindrical body;

a locking means for preventing movement of said second stopper block in a direction apart from an objective tire, said first and second stopper blocks respectively remaining in contact with said tire at both sides of a point whereon said tire makes contact with a road surface, in a direction against the rotating direction of an objective wheel;

a pair of chains secured to said first and second stopper blocks for fastening and restraining said objective wheel, said pair of chains being extended from the inside to the outside of said wheel forming an X-shape;

a key-provided cover unit for fully concealing mechanical components available for releasing the restrained state effected by said chains;

a cylindrical strut coupled to said cylindrical body;

a vertical shaft member having a T-shaped front view, wherein a first end of said vertical shaft member is inserted in said cylindrical strut from a top end of said strut and said vertical shaft member has an elevating body portion attached thereto at a second end; and a plurality of hooks being attached to said elevating body portion permitting the ends of said chains to be hung thereon.

2. The vehicle detention device as defined in claim 1, wherein said stopper blocks are respectively provided with a plate body coming into contact with external lateral surface of an objective tire.

3. The vehicle detention device as defined in claim 1, further comprising;

multistep teeth formed on the top surface of a square-sectional area of said slidable shaft at equal pitches in the lengthwise direction thereof; and a locking claw provided inside said second body end of said horizontally extended cylindrical body, wherein said locking claw ratchets over said multistep teeth when said second stopper block is shifted in a direction closer to said first stopper block and wherein said locking claw comes into engagement with said multistep teeth when said second stopper block is shifted in a direction apart from said first stopper block.

4. The vehicle detention device as defined in claim 3, further comprising an unlocking preventive member provided inside said second body end of said cylindrical body for preventing said locking claw from being disengaged from said multistep teeth by insertion of a tampering device into a clearance between a square-sectional domain of said cylindrical body and said cylindrical body.

5. The vehicle detention device as defined in claim 1, further comprising;

a cylindrical strut coupled to said cylindrical body;

a vertical shaft member having an elevating body portion coupled thereto, said vertical shaft member and said elevating body portion having a T-shape in the front view, wherein said vertical shaft member is insertable in said cylindrical strut from a top end thereof;

multistep teeth formed on an external surface of said vertical member, said multistep teeth spaced at equal pitches in a lengthwise direction along said vertical shaft member; and a looking claw provided inside a casing secured to a top end of said cylindrical strut, wherein said locking claw comes into engagement with said multistep teeth in order to position said elevating body portion at a predetermined height.

6. The vehicle detention device as defined in claim 5, further comprising a fastening member for securing against a bottom end of said locking claw said fastening member having a threaded tip end for screwing into said casing, said fastening member for securing a toothed portion located at the bottom end of said locking claw by engaging said toothed portion with said multistep teeth.

7. The vehicle detention device as defined in claim 1, wherein said second stopper block is secured to said cylindrical body with a hinge means enabling said second stopper block to be rotated on said hinge means about a vertical axis.

8. The vehicle detention device as defined in claim 1, further comprising a pair of extended members integrally secured to said respective first and second stopper blocks, wherein a continuous upwardly inclined surface is formed on a bottom surface of said stopper blocks and said pair of extended members for forming a clearance between said bottom surface and a bottom edge of said stopper blocks and said pair of extended members respectively and said road surface.

9. A vehicle detention device for preventing movement of an objective vehicle comprising:
- a first stopper block secured to a first body end of a horizontally extended cylindrical body;
- a second stopper block secured to a first shaft end of a slidable shaft having a second shaft end capable of freely entering into and moving out of a second body end of said cylindrical body;
- a locking means for preventing movement of said second stopper block in a direction apart from an objective tire, said first and second stopper blocks respectively remaining in contact with said tire at both sides of a point whereon said tire makes contact with a road surface, in a direction against the rotating direction of an objective wheel;
- a pair of chains secured to said first and second stopper blocks for fastening and restraining said objective wheel, said pair of chains being extended from the inside to the outside of said wheel forming an X-shape;
- a key-provided cover unit for fully concealing mechanical components available for releasing the restrained state effected by said chains;
- a cylindrical strut coupled to said cylindrical body;
- a vertical shaft member having a T-shaped front view, wherein a first end of said vertical shaft member is inserted in said cylindrical strut from a top end of said strut and said vertical shaft member has an elevating body portion attached thereto at a second end;
- a cover unit having a top end coupled to a top end of said horizontal member; and
- a key-provided rotary hook provided for said cover unit, wherein said rotary hook is engageable with an engaging groove of an engaging shaft coupled to said shaft member.

* * * * *